Patented Aug. 15, 1950

2,518,704

UNITED STATES PATENT OFFICE 2,518,704 o- AND m-HYDROXYBENZAMIDOBENZALDE-HYDES AND THEIR ACETALS WITH LOWER ALKANOLS AND ALKANEDIOLS

Elmore Louis Martin, Wilmington, Del., assignor to E. I. du Pont de Nemours & Company, Wilmington, Del., a corporation of Delaware No Drawing. Application March 6, 1948, Serial No. 13,523

3 Claims. (Cl. 260—338)

1

This invention pertains to new ortho- and meta-hydroxybenzamidobenzaldehydes and to their lower acetals and their prepartion. More particularly it pertains to such acetals with lower monohydric and dihydric alcohols.

An object of this invention is to provide a new class of substituted benzaldehydes and acetals thereof. A further object is to provide a new class of hydroxybenzamidobenzaldehyde acetals which couple to form quinoneimine dyes. Still other objects will be apparent from the following description of the invention.

The present invention provides a new class of m-(ortho- and meta-monohydroxybenzamido)-benzaldehydes and their acetals with an alkanol of 1 to 4 carbon atoms or a 1,2- or 1,3-alkanediol of 2 to 4 carbon atoms which have a reactive position para to the hydroxyl group. The compounds may be unsubstituted in the two benzene rings or may contain lower aliphatic monovalent hydrocarbon radicals of 1 to 4 carbon atoms, a carboxylic or sulfonic acid group or a halogen atom, e. g., chlorine and bromine. The position para to the hydroxy group can be reactive by reason of its being unsubstituted or because it contains a group replaceable in dye coupling reactions such as a halogen atom, e. g., chlorine or bromine, a carboxylic acid group or a sulfonic acid group.

The novel m-(ortho-monohydroxybenzamido)-benzaldehydes may be represented by the formula

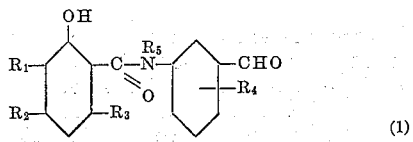

(1)

and the related m-(meta-monohydroxybenzamido)benzaldehydes may be represented by the formula

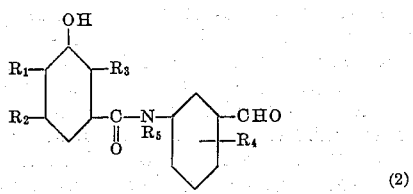

(2)

In each of the above formulae, $R_1$, $R_2$, $R_3$, and $R_4$ are hydrogen atoms, halogen atoms, e. g., chlorine or bromine, monovalent aliphatic hydrocarbon radicals of 1 to 4 carbon atoms, e. g., methyl, ethyl, allyl, isopropyl, n-butyl, or an alkoxy radical of 1 to 4 carbon atoms. $R_5$ is preferably hydrogen but can be an alkyl radical of 1 to 6 carbon atoms or an aryl radical of 6 to 10 carbon atoms.

The acetals of the compounds of formulae (1) and (2) included in the present invention are those of alkanols of 1 to 4 carbon atoms, e. g.,

2 methanol, ethanol, n-propanol, isopropanol, n-butanol and isobutanol; and alkanediols of 2 to 4 carbon atoms, e. g., ethylene glycol, 1,3-propylene glycol, 1,2-propylene glycol and 1,3-butylene glycol. The acetal nucleus of such compounds may be represented by the formulae

(3)

and

(4)

where R is an alkyl radical of 1 to 4 carbon atoms which corresponds to the above alcohols and $R^1$ is an alkylene radical of 2 to 4 carbon atoms which corresponds to the above alkanediols. The free bond is of course attached to the amidobenzene nucleus of the compounds illustrated in Formulae (1) and (2). The hemi-acetals are not comprehended or covered by the above formulae.

The above compounds can readily be prepared from the corresponding monohydroxybenzoic acids by converting them to the corresponding acid chlorides by reaction with thionyl chloride, phosphorous trichloride, phosphorous oxychloride, or phosphorous pentachloride, or mixtures thereof. In preparing these acid halides, it is advantageous to add to the reaction mixture from 0.1 to 1% by weight of pyridine based on the halogenating agent, e. g., thionyl chloride. Before this conversion is effected, the hydroxy group may be protected by acylation by various types of acylating agents, such as acetyl chloride, acetic anhydride, ethyl chlorocarbonate, benzoyl chloride, p-toluene sulfonyl chloride, etc.

The monohydroxybenzoic acid chloride is then condensed with m-aminobenzaldehyde or a substitution product thereof or a simple acetal of such aldehydes, e. g., a dimethyl, diethyl, or ethylene glycol acetal. The reaction is carried out in a liquid medium in the presence of a basic agent capable of removing hydrogen chloride formed. Suitable acid neutralization agents that can be used include alkali metal carbonates, bicarbonates and hydroxides, organic tertiary bases such as pyridine, piperidine, triethylamine, etc. Useful liquid media include dioxane, water, water-dioxane mixtures, ether, acetone, dimethyl formamide, etc. In place of carboxylic acid chlorides, there may be used carboxylic acid halides other than the chlorides, e. g., the corresponding bromides, but the chlorides are of most practical use.

These m-(ortho- or meta-monohydroxybenzamido)benzaldehydes and acetals may be condensed with polyvinyl alcohols or hydrolyzed copolymers of vinyl esters with other vinyl monomers to form polyvinylacetals according to the method of U. S. 2,310,943 or by any other suitable modification thereof. Thus, the aldehyde and polyvinyl alcohol can be stirred together in suspension or solution in an organic or aqueous organic solvent system containing a catalytic amount of a strong acid, e. g., phosphoric, hydrochloric, formic, chloroacetic, etc., and an acetal obtained.

Of particular interest for use in photographic color film are the color-forming acetals of polyvinyl alcohol and m-(3-methylsalicylamido)-benzaldehyde and especially those in which 0.75 to 7.5% of the hydroxyl groups of the polyvinyl alcohol are acetalized with this aldehyde. In a desirable modification of these acetals from 0.1% to 5% of the hydroxyls are further acetalized with an aldehydoacid, e. g., o-sulfobenzaldehyde, phthalaldehydic acid and the like.

The invention will be further illustrated by the following examples in which parts are by weight unless otherwise stated.

EXAMPLE I m-(3-allylsalicylamido)benzaldehyde 3-allylsalicylyl chloride was prepared by the dropwise addition of 0.5 part of pyridine to a mechanically stirred mixture of 17.8 parts of 3-allylsalicylic acid and 40 parts of thionyl chloride at room temperature. After thirty minutes, the excess thionyl chloride was removed under reduced pressure and the acid chloride was dissolved in 20 parts of anhydrous dioxane and was added dropwise to a mechanically stirred suspension of 16 parts of anhydrous potassium carbonate, 16.5 parts of m-aminobenzaldehyde ethylene glycol acetal, 50 parts of water, and 30 parts of acetone maintained at 0° C. by means of external cooling. After stirring for 0.5 hour the mixture was diluted with water, the reaction product extracted with ether, and the ether removed by distillation. The resulting oil was dissolved in 120 parts of acetone, the solution was heated to 40–45° C., and 55 parts of 3 N hydrochloric acid was added slowly. The free aldehyde separated as an oil which soon solidified. Crystallization of the air-dried product from a mixture of benzene and petroleum ether gave fine felt-like needles melting at 115–118° C. of the aldehyde named in the heading.

EXAMPLE II m-(3-allyl-4-methylsalicylamido)benzaldehyde

To a mechanically stirred suspension of 19.2 parts of 3-allyl-4-methylsalicylic acid in 40 parts of thionyl chloride there was added dropwise 0.5 part of pyridine. After about one hour at room temperature the evolution of gases had ceased and a homogeneous solution was obtained. The excess thionyl chloride was removed under reduced pressure at 25° C., the acid chloride was dissolved in 20 parts of anhydrous dioxane and was added dropwise to a mechanically stirred mixture of 16 parts of potassium carbonate, 16.5 parts of m-aminobenzaldehyde ethylene glycol acetal, 40 parts of water, and 40 parts of acetone maintained at 0° C., by means of external cooling. The mixture was stirred for 0.5 hour after the addition of the acid chloride was complete and was diluted with water. The acetal was obtained as a solid which was difficult to purify by crystallization. The free aldehyde was obtained in crystalline form by the addition of 3 N hydrochloric acid to an acetone solution of the acetal at 40–45° C., essentially as described in Example I. Crystallization of the product from benzene gave colorless plates melting at 146–148° C. of m-(3-allyl-4-methylsalicylamido)benzaldehyde.

EXAMPLE III m-(3-isopropyl-6-methylsalicylamido)-benzaldehyde

To a solution of 9.7 grams of 3-isopropyl-6-methylsalicylic acid in 20 parts of dioxane there was added 6.5 parts of ethyl chlorocarbonate and 20 parts of diethylaniline. After stirring at room temperature for several hours, a precipitate of diethylaniline hydrochloride separated. The mixture was poured into excess dilute hydrochloric acid, the oil was extracted with ether, the ethereal solution was dried, and the ether was removed by heating at 60° C. under reduced pressure for several minutes. To the resulting 2-ethylcarbonato-3-isopropyl-6-methylbenzoic acid was added 6 parts of thionyl chloride and the mixture heated at 50–60° C. until evolution of gases was complete. After removal of the excess thionyl chloride under reduced pressure, the acid chloride was dissolved in 20 parts of dioxane and was added dropwise to a mechanically stirred mixture of 7 parts of potassium carbonate, 8.3 parts of m-aminobenzaldehyde ethylene glycol acetal, 20 parts of water, and 25 parts of acetone maintained at 0° C. by means of external cooling. After stirring for thirty minutes, the mixture was diluted with water, the oil was extracted with ether, the ether was removed and the residue was warmed with an excess of 10% potassium hydroxide solution until a homogeneous solution was obtained. The resulting solution was cooled and acidified with 20% acetic acid. The resulting acetal could not be induced to crystallize and was converted to the aldehyde named in the heading essentially as described in Example I.

EXAMPLE IV m-Salicylamidobenzaldehyde ethylene glycol acetal 2-acetoxybenzoyl chloride was prepared by adding 50 parts of thionyl chloride to a solution of 45 parts of acetyl salicylic acid in 85 parts of benzene heated at gentle reflux. Removal of the benzene and excess thionyl chloride under reduced pressure gave a light-yellow oil which was dissolved in 40 parts of acetone and the resulting solution was added dropwise to a mechanically stirred mixture of 40 parts of anhydrous potassium carbonate, 41 parts of m-aminobenzaldehyde ethylene glycol acetal, 60 parts of acetone, and 60 parts of water maintained at 0° C. by means of external cooling. After stirring for thirty minutes following the addition of the acid chloride, the mixture was diluted with water. The resulting oil was extracted with ether, the ether removed by distillation, and the residue was stirred on a steam bath with a solution of 30 parts of potassium hydroxide in 150 parts of water. As soon as a homogeneous solution was obtained, the mixture was cooled and carefully acidified by the addition of 20% acetic acid. The compound named in the heading crystallizes from aqueous acetone in the form of colorless crystals melting at 152–154° C.

Anal.—Calc'd for $C_{16}H_{15}O_4N$: C, 67.34; H, 5.20; N, 4.91. Found: C, 67.52, 67.48; H, 5.46, 5.48; N, 5.14, 5.18.

EXAMPLE V m-(4-methylsalicylamido)benzaldehyde ethylene glycol acetal 2-acetoxy-4-methylbenzoyl chloride was prepared by heating a suspension of 38 parts of 2-acetoxy-4-methylbenzoic acid with 40 parts of thionyl chloride at 40–45° C. until solution of the acid was complete and the evolution of hydrogen chloride and sulfur dioxide had ceased. The residual acid chloride, after removal of the excess thionyl chloride under reduced pressure, was dissolved in 40 parts of acetone and was added drop-wise to a mechanically stirred mixture of 28 parts of anhydrous potassium carbonate, 33 parts of m-aminobenzaldehyde ethylene glycol acetal, 80 parts of acetone, and 60 parts of water maintained at 0° C. by means of external cooling. After stirring for thirty minutes, the mixture was diluted with water, the organic material extracted with ether, the ether removed by distillation, and the residue was warmed with a solution of 30 parts of potassium hydroxide in 250 parts of water. As soon as a homogeneous solution was obtained, the mixture was cooled and acidified with 20% acetic acid. Crystallization of the compound from acetone gave glistening plates melting at 176–178° C. of the acetal named in the heading.

Anal.—Calc'd for $C_{17}H_{17}O_2N$: C, 68.20; H, 5.73; N, 4.68. Found: C, 68.43, 68.20; H, 5.83, 5.87; N, 5.06, 5.12.

EXAMPLE VI m-(3-methylsalicylamindo)benzaldehyde ethylene glycol acetal

To a mechanically stirred suspension of 46 parts of 3-methylsalicylic acid in 120 parts of thionyl chloride there was added dropwise 1.5 parts of pyridine. After stirring at 25° C. for 1.5 hours, a homogeneous solution was obtained. The excess thionyl chloride was removed under reduced pressure and the acid chloride was dissolved in 60 parts of anhydrous dioxane and was added dropwise to a mechanically stirred mixture of 52 parts of potassium carbonate, 50 parts of m-aminobenzaldehyde ethylene glycol acetal, 200 parts of water and 60 parts of acetone maintained at 0° C. by means of external cooling. After dilution with water, the colorless crystals were collected, washed with cold water, and air dried. Crystallization of the compound from methylene chloride gave 68 parts of colorless crystals melting at 134–135° C. of the acetal named in the heading.

Anal.—Calc'd for $C_{17}H_{17}O_2N$: C, 68.20; H, 5.73; N, 4.68. Found: C, 68.20, 67.98; H, 5.58, 5.85; N, 5.2.

EXAMPLE VII m-(3,6-dimethylsalicylamido)benzaldehyde ethylene glycol acetal

A mixture of 23.8 grams of 3,6-dimethyl-2-ethylcarbonatobenzoic acid, prepared essentially as described for the preparation of 2-ethylcarbonato-3-isopropyl-6-methylbenzoic acid in Example III, and 32 parts of thionyl chloride was heated on a steam bath until evolution of gases was complete. The excess thionyl chloride was removed under reduced pressure and dissolved in 30 parts of dioxane. Acylation of m-aminobenzaldehyde ethylene glycol acetal essentially as described in Example I gave m-(3,6-dimethyl-2-ethylcarbonatobenzamido)benzaldehyde ethylene glycol acetal. This compound was heated with excess 10% potassium hydroxide solution at 75° C. until a homogeneous solution was obtained. After cooling, m-(3,6-dimethylsalicylamido)-benzaldehyde ethylene glycol acetal was precipitated by the passage of carbon dioxide into the alkaline solution. Crystallization of the acetal from methylene chloride-petroleum ether gave colorless plates melting at 141–143° C. of m-(3,6-dimethylsalicylamido)benzaldehyde ethylene glycol acetal.

EXAMPLE VIII m-(6-chloro-3-methylsalicylamido)benzaldehyde ethylene glycol acetal

This compound was prepared essentially as described for the preparation of m-(3,6-dimethylsalicylamido)benzaldehyde ethylene glycol acetal in Example VII. This compound melts at 142–144° C. after crystallization from benzene-petroleum ether.

EXAMPLE IX m-(4-chloro-3-methylsalicylamido)benzaldehyde ethylene glycol acetal

This compound was prepared essentially as described for the preparation of m-(3-methylsalicylamido)benzaldehyde ethylene glycol acetal as described in Example VI. The compound crystallizes from benzene in the form of fine needles melting at 163–165° C.

Anal.—Calc'd. for $C_{17}H_{16}O_4NCl$: C, 61.15; H, 4.84; C, 10.63. Found: C, 60.90, 61.55; H, 4.81, 5.06; C, 10.65, 10.70.

EXAMPLE X m-(3-hydroxy-4-methylbenzamido)benzaldehyde ethylene glycol acetal 3-acetoxy-4-methyl benzoyl chloride was prepared by heating at gentle reflux a solution of 19.4 parts of 3-acetoxy-4-methylbenzoic acid in 50 parts of benzene with 24 parts of thionyl chloride until evolution of hydrogen chloride was complete. Removal of the benzene and excess thionyl chloride under reduced pressure gave an oil which was dissolved in anhydrous dioxane and used for the acylation of 16.5 parts of m-aminobenzaldehyde ethylene glycol acetal essentially as described in Example I. The resulting m-(3-acetoxy-4-methylbenzamido)benzaldehyde ethylene glycol acetal melted at 118–120° C. after crystallization from a mixture of benzene and petroleum ether. The compound was converted to a color-former essentially as described for the hydrolysis of m-(2-acetoxybenzamido)benzaldehyde ethylene glycol acetal of Example IV. Crystallization of the m-(3-hydroxy-4-methylbenzamido)benzaldehyde ethylene glycol acetal from a mixture of acetone and benzene gave colorless crystals melting at 152–154° C.

Anal.—Calc'd. for $C_{17}H_{17}O_4N$: C, 68.20; H, 5.73; N, 4.68. Found: C, 68.26, 68.43; H, 5.87, 5.97; N, 4.71, 4.78.

In general, the condensation of the acid chloride with the aminobenzaldehyde can be carried out at temperatures between —10° C. and 100° C., although the range of 0° C.–30° C. is the most practical and, therefore, is preferred.

The aldehydes represented by formulae (1) and (2) are colorless, crystalline solids which are soluble in organic solvents such as alcohols, ketones, esters, ethers, lower chlorinated aliphatic hydrocarbons, and aromatic hydrocarbons. They are insoluble in aliphatic hydrocarbons and water. These aldehydes are also soluble in aqueous alkali, from which the compound can be precipitated unchanged by the addition of carbon dioxide. They react readily with halogens, nitrous acid, sulfuric acid, and nitric acid to give the corresponding compound having the substituent introduced in the position para- to the hydroxyl group. They also react readily with diazotized aromatic amino compounds to give yellow-to-red dyes. In general, the acetals of the above aldehydes, and particularly the cyclic ethylene glycol and trimethylene glycol acetals, are likewise crystalline compounds which are somewhat lower melting and somewhat more soluble in organic solvents than the aldehydes from which they are derived.

In place of the specific monohydroxybenzoic acid chlorides of the examples, there can be used other such acid chlorides including the following: 3-ethyl-2-hydroxybenzoyl chloride, 3-propyl-2-hydroxybenzoyl chloride, 3 - isopropyl - 2 - hydroxybenzoyl chloride, 3-hydroxy-2-allylbenzoyl chloride, 3-hydroxy-4-allylbenzoyl chloride, 2,4-diallyl - 3 - hydroxybenzoyl chloride, 6 - methylsalicylyl chloride and 3-hydroxy-5-methylbenzoyl chloride. The acid halide can be used in equimolecular proportions with the aminoaldehydes or in excess up to 3 or more mols.

In place of the m-aminobenzaldehyde ethylene glycol acetal of the examples, other aminobenzaldehydes and their dialkyl, or lower glycol acetals can be employed to prepare products similar to those of this invention. Additional suitable aldehydes of this type include:

o-aminobenzaldehyde
p-aminobenzaldehyde
3-amino-4-chlorobenzaldehyde
5-amino-2-chlorobenzaldehyde
3-amino-4-methylbenzaldehyde
3-amino-4,6-dichlorobenzaldehyde
3-amino-4-methoxybenzaldehyde The N-mono-alkyl and N-monoaryl derivatives of the above-mentioned aldehydes are also useful. Suitable alkyl radicals include methyl, ethyl, propyl, butyl, hexyl, and cyclohexyl. Suitable aryl radicals include phenyl, p-chlorophenyl, α-naphthyl and β-naphthyl.

These new m-(ortho- and meta-monohydroxybenzamido)benzaldehydes are useful in preparing dyes for application to textiles, fibers, filaments, and films. These dyes retain their reactive aldehyde function and can thus react with the film and fiber substrate to produce fast-to-washing dyed articles. Included in the substrates are cellulosic fibers, e. g., cotton, viscose yarn, etc.; protein fibers, e. g., wool, silk; casein fibers and the like containing hydroxyl, amino or amide groups which react readily with the aldehyde group.

Polyvinyl acetals prepared from these new aldehydes are of value in other color processes where it is desired to have a hydroxybenzoic acid dye intermediate structure.

The quinoneimine dyes formed by color coupling development of silver halide in the presence of the m - (hydroxybenzamido)benzaldehyde acetals of this invention possess excellent spectral adsorption characteristics which make them especially useful as blue-green components in three color photography. The color-developed dyes obtained from these compounds with a p-phenylene-diamine type developer have good light stability, high tinctorial strength, and are exceptionally brilliant. Polyvinyl acetals obtained from these components are of value as blue-green color former silver halide binding agents in the preparation of a non-gelatin photographic color film and paper. The uncoupled color-forming polyvinyl acetals are exceptionally free from discoloration on exposure to light.

The compounds of the present invention can be prepared in good yields from available, economical intermediates. They can be prepared in a high state of purity which is of great advantage in preparing polyvinyl acetals therefrom which are well suited for the preparation of stain-free brilliant color photographs by the procedure of U. S. Patent 2,397,864.

As many widely different embodiments of this invention can be made without departing from the spirit and scope thereof, it is to be understood that the invention is not to be limited except as defined by the claims.

What is claimed is:

1. A compound taken from the group consisting of the aldehydes represented by the formulae

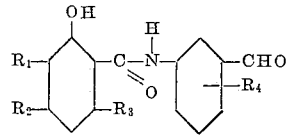

and

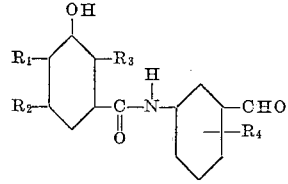

wherein $R_1$ is a monovalent aliphatic hydrocarbon radical of 1 to 4 carbon atoms taken from the group consisting of alkyl and allyl; one only of the radicals $R_2$ and $R_3$ is a member taken from the group consisting of hydrogen, chlorine, bromine, alkyl of 1 to 4 carbon atoms and allyl and the other is hydrogen, $R_4$ is a member taken from the group consisting of hydrogen, chlorine, bromine, alkyl of 1 to 4 carbon atoms, allyl and alkoxy of 1 to 4 carbon atoms; and their acetals with a hydroxy compound taken from the group consisting of alkanols of 1 to 4 carbon atoms and 1,2- and 1,3-alkanediols of 2 to 4 carbon atoms.

2. The aldehyde of the formula

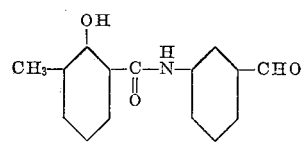

3. The acetal of the formula

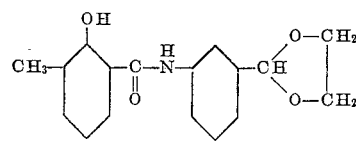

ELMORE LOUIS MARTIN.

REFERENCES CITED

The following references are of record in the file of this patent:

UNITED STATES PATENTS

| Number | Name | Date |
|---|---|---|
| 1,876,955 | Kalischer et al. | Sept. 13, 1932 |
| 2,380,032 | Dorough | July 10, 1945 |
| 2,423,572 | Woodward | July 8, 1947 |
| 2,464,597 | McQueen | Mar. 15, 1949 |
| 2,465,067 | Corner et al. | Mar. 22, 1949 |